(12) United States Patent
Vandayburg et al.

(10) Patent No.: US 6,399,246 B1
(45) Date of Patent: Jun. 4, 2002

(54) LATEX BINDER FOR NON-AQUEOUS BATTERY ELECTRODES

(75) Inventors: Mark D. Vandayburg, Westlake; George E. Blomgren, Lakewood, both of OH (US)

(73) Assignee: Eveready Battery Company, Inc., St. Louis, MO (US)

(*) Notice: Subject to any disclaimer, the term of this patent is extended or adjusted under 35 U.S.C. 154(b) by 0 days.

(21) Appl. No.: 09/566,184

(22) Filed: May 5, 2000

(51) Int. Cl.$^7$ ................................................ H01M 4/62
(52) U.S. Cl. .................. 429/217; 429/218.1; 429/221; 429/223; 429/224; 429/231.1; 429/231.3; 429/231.4; 429/231.5; 429/231.8
(58) Field of Search .............................. 429/217, 231.1, 429/223, 224, 231.5, 218.1, 221, 231.3, 231.4, 231.8

(56) References Cited

U.S. PATENT DOCUMENTS

| | | | |
|---|---|---|---|
| 3,184,339 A | 5/1965 | Ellis | |
| 4,014,712 A | 3/1977 | Bryndal | 429/57 |
| 4,260,669 A | 4/1981 | Kerg | 429/215 |
| 5,102,754 A | 4/1992 | Corretja | 429/222 |
| 5,262,255 A | 11/1993 | Ito et al. | 429/217 |
| 5,378,560 A * | 1/1995 | Tomiyama | 429/217 |
| 5,525,444 A | 6/1996 | Ito et al. | 429/206 |
| 5,595,841 A | 1/1997 | Suzuki | 429/217 |
| 5,609,975 A | 3/1997 | Hasegawa et al. | 429/217 |
| 5,665,212 A | 9/1997 | Zhong et al. | 204/280 |
| 5,677,083 A | 10/1997 | Tomiyama | 429/194 |
| 5,707,756 A | 1/1998 | Inoue et al. | 429/57 |
| 5,965,290 A | 10/1999 | Shimizu et al. | 429/94 |
| 5,976,731 A | 11/1999 | Negoro et al. | 429/328 |
| 6,235,427 B1 * | 5/2001 | Idota et al. | 429/231.1 |

FOREIGN PATENT DOCUMENTS

| | | |
|---|---|---|
| JP | 58225567 | 12/1983 |
| JP | 62243249 | 10/1987 |

\* cited by examiner

Primary Examiner—Laura Weiner
(74) Attorney, Agent, or Firm—Russell H. Toye, Jr.; Robert W. Welsh

(57) ABSTRACT

A water-soluble binder useful for preparing an electrode for either primary or secondary batteries, having either aqueous or non-aqueous electrolyte, contains polyacrylamide and at least one copolymer selected from carboxylated styrene-butadiene copolymer and styrene-acrylate copolymer. The water-dispersible binder eliminates or reduces the need for organic solvents during preparation of an electrode made of a particulate active electrode material. The binder exhibits good chemical resistance, adhesive properties, flexibility and resilience, making it well suited for use in preparing batteries having a spirally wound electrode assembly.

63 Claims, 2 Drawing Sheets

LATEX BINDER FOR NON-AQUEOUS BATTERY ELECTRODES

FIELD OF THE INVENTION

This invention relates to batteries, and more particularly to batteries having an electrode comprised of a particulate active electrode material and a binder.

BACKGROUND OF THE INVENTION

Non-aqueous batteries, i.e. batteries having a non-aqueous electrolyte, including both non-aqueous primary batteries and non-aqueous secondary batteries, are well known and commonly used, especially in advanced electronic appliances, such as portable personal computers, compact video cameras, and pocket or cellular telephones. Certain non-aqueous primary batteries, such as those having lithium as an active anode material, have various advantages over other primary batteries, such as high voltage, high energy density with low self-discharge, and extremely long storage life. Certain non-aqueous secondary batteries have improved charge and discharge characteristics such as improved charge and discharge capacity, as well as excellent cycle life and stability.

Commercially available non-aqueous batteries typically include at least one electrode that is made of a particulate active material that is held together by a binder comprising one or more polymers. The polymers commonly used in binders for making electrodes for non-aqueous batteries are generally insoluble in water and are not dispersible, or at least not easily dispersible, in water. Examples of polymers that are used as binders for an electrode in a non-aqueous battery include ethylene-propylene copolymer; a terpolymer of ethylene, propylene and a diene (EPDM); polytetrafluoroethylene (PTFE); and polyvinylidene fluoride (PVDF). A disadvantage with binders comprised of polymers that are not water soluble or water dispersible is that organic solvents must be used during preparation of the electrode. The use of organic solvents is undesirable on account of the relatively high costs associated with environmentally compliant handling and disposal of the organic solvents.

Accordingly, the use of water-soluble and/or water-dispersible polymers as binders for preparing electrolytes from particulate active materials is highly desirable. Known water-soluble polymers suitable as binders for electrodes include carboxymethyl cellulose and poly(acrylic acid). However, the known binders comprising one or more water-soluble or water-dispersible polymers have not exhibited satisfactory adhesive properties for use in batteries.

Good adhesion is necessary to prevent disintegration of the electrode or separation of the electrode material from a metallic carrier.

In addition to good adhesion, the binder must also be resistant to the organic solvent of the electrolyte. For example, the binder must not soften, dissolve or decompose when contacted by the non-aqueous electrolyte. Further, the binder must not react with the anode or cathode active materials, which may include highly oxidizing materials such as $MnO_2$ or $LiMn_2O_4$, and highly reducing materials such as lithiated carbonaceous materials. Another requirement is that the binder must exhibit sufficient flexibility to withstand expansion and/contraction of the electrode during discharge. In the case of secondary batteries, the binder must exhibit resilient flexibility to withstand many cycles of alternating expansion and contraction associated with charging and discharging the battery.

The known binders comprised of one or more water-soluble and/or water-dispersible polymers have not exhibited an excellent combination of chemical resistance, adhesiveness, flexibility, and resilience.

SUMMARY OF THE INVENTION

This invention pertains to a water-soluble binder for an electrode in a battery; an aqueous binder solution useful for preparing an electrode for a battery; an electrode mixture useful for preparing an electrode for a battery; a process for making an electrode for a battery; an electrode for a battery; and a battery. The binder of this invention exhibits excellent chemical resistance to electrolytes, including non-aqueous electrolytes, and excellent chemical resistance to active electrode materials, including active electrode materials commonly employed in primary and secondary non-aqueous batteries. The binder in the invention also exhibits excellent adhesive properties, flexibility and resilience. As a result of these properties, the binders of this invention are well suited for use in preparing electrodes for a wide variety of batteries, including both primary and secondary batteries, batteries having aqueous or non-aqueous electrolytes, and batteries having sheet-like electrodes arranged in complicated geometries, such as spirally wound batteries.

The water-dispersible binders of this invention comprise polyacrylamide, and at least one copolymer selected from the group consisting of carboxylated styrene-butadiene copolymer and styrene-acrylate copolymer.

The aqueous binder solution of this invention is comprised of water, polyacrylamide, and at least one copolymer selected from the group consisting of carboxylated styrene-butadiene copolymer and styrene-acrylate copolymer.

The electrode mixture of this invention comprises an aqueous binder solution containing water, polyacrylamide, and a copolymer selected from the group consisting of carboxylated styrene-butadiene copolymer and styrene-acrylate copolymer; and an active electrode material.

The invention also encompasses a process for making an electrode for a battery. The process comprises the steps of providing an aqueous binder solution, combining and mixing the aqueous binder solution with an active electrode material to obtain a formable electrode mixture, shaping the electrode mixture into a desired electrode form, and removing the water from the desired electrode form to make the electrode. The aqueous binder dispersion includes water and a water-dispersible binder. The water-soluble binder includes polyacrylamide and at least one copolymer selected from the group consisting of carboxylated styrene-butadiene copolymer and styrene-acrylate copolymer. The invention also encompasses the resulting electrode.

In accordance with another aspect of the invention a battery is provided with comprises a positive electrode, a negative electrode, and an electrolyte, wherein at least one of the positive electrode and the negative electrode is comprised of an electrode mixture containing an active electrode material and a binder, in which the binder contains polyacrylamide and at least one copolymer selected from the group consisting of carboxylated styrene-butadiene copolymer and styrene-acrylate copolymer.

These and other features, advantages and objects of the present invention will be further understood and appreciated by those skilled in the art by reference to the following specification, claims and appended drawings.

DETAILED DESCRIPTION OF PREFERRED EMBODIMENT

Figure 1:
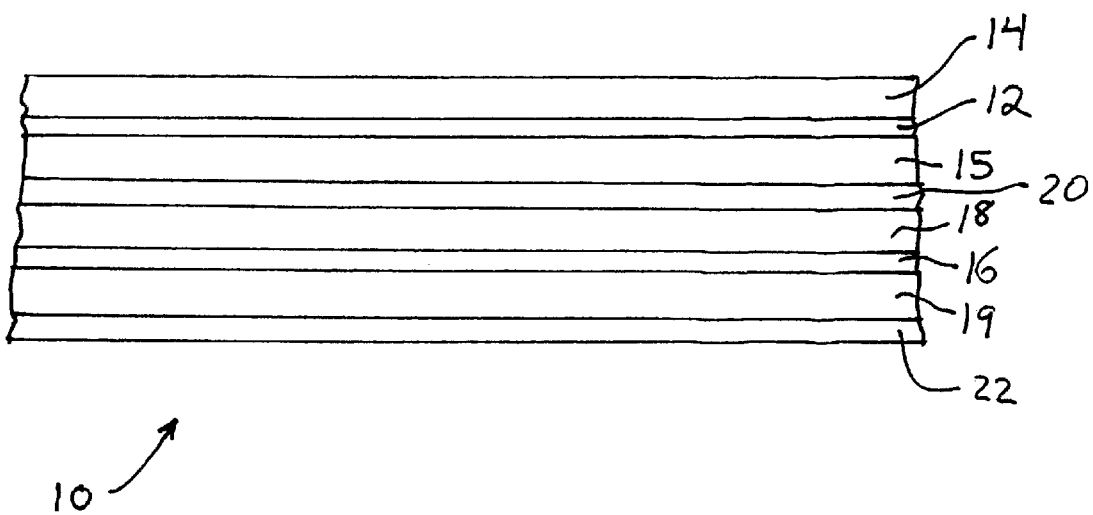
FIG. 1 is schematic representation of a laminate comprising a first electrode, a second electrode, and a separator disposed between the first electrode and the second electrode.

The present invention is the result of extensive investigation of various binder combinations for an aqueous based electrode mixture used for making electrodes for rechargeable lithium ion batteries. The objective of the investigation was to discover water-soluble binders that eliminate the need for organic solvents in the preparation of electrodes for batteries having a non-aqueous electrolyte, whereby environmental concerns and costs associated with proper handling and disposal of organic solvents can be reduced or eliminated. The investigations have lead to the discovery of a specific water-soluble binder that is particularly well suited for preparing sheet-like electrodes that may be used in complex electrode geometries that require excellent flexibility, such as in spirally wound batteries having a non-aqueous electrolyte. In addition to being water-soluble and thereby eliminating or reducing the need for organic solvents during the preparation of an electrode, the binder exhibits excellent adhesive properties for holding particles together in an electrode mix, and for holding the electrode mix to a metallic carrier or current collector, while also exhibiting good flexibility to permit bending or winding of the electrodes without damage or flaking of the material from the electrodes. The binder is comprised of polyacrylamide and at least one material selected from the group consisting of carboxylated styrene-butadiene copolymer and styrene-acrylate copolymer. While not being bound to any particular theory, it is believed that the carboxylation of the styrene-butadiene copolymer provides a negative charge on the polymer backbone, thus improving the adherence of the styrene-butadiene copolymer to a metal surface. It is also believed that the acrylate groups of the styrene-acrylate copolymer perform a similar function to that of the carboxylate groups of the styrene-butadiene copolymer. Polyacrylamide is a linear water-soluble polymer which is believed to improve the smoothness and uniformity of the mix, thereby positively affecting the rheological properties of the mix and the evenness of the mix coating.

Methods of preparing a suitable carboxylated styrene-butadiene copolymer are well known in the art, and suitable carboxylated styrene-butadiene copolymers are commercially available. An example of a suitable commercially available carboxylated-styrene-butadiene copolymer is ROVENE® 4076. Processes for preparing suitable styrene-acrylate copolymers are also well known in the art, and suitable styrene-acrylate copolymers are commercially available. Examples of suitable styrene-acrylate copolymers are RHOPLEX® 1018 and RHOPLEX® 2200, available from Rohm & Haas. Similarly, processes for preparing a suitable polyacrylamide are well known and suitable polyacrylamides are commercially available. An example of a suitable commercially available polyacrylamide is CYANAMER® N-300, available from American Cyanamid.

The amount of binder which may be used for preparing an electrode is subject to various factors. One such factor is the surface area and amount of the active material, and the surface area and amount of any conductive additives (e.g., graphites and/or carbon black) which are added to the electrode mix. These factors are believed to be important because the binder particles provide bridges between the conductor particles and active material particles, keeping them in contact. For a very fine particle material, such as acetylene black, the amount of binder should be increased to insure that all acetylene black particles are kept in contact with active material particles and are not free to move through the electrode or into the electrolyte/separator region of a battery, where they may cause shorting. The optimum amount of binder is generally determined through an empirical process by adding binder until good adhesion and cohesion are obtained with the minimum amount of binder material. The preferred level of styrene-acrylate copolymer and/or carboxyated styrene-butadiene copolymer is from about 0.5 to about 4% of the dry weight of the positive electrode mix, and the preferred amount of styrene-acrylate copolymer and/or carboxylated styrene-butadiene copolymer for a carbonaceous negative active material is from about 1 to about 10% of the dry weight of the electrode mix, and more preferably from about 2 to about 7%. The amount of polyacrylamide for both positive and negative electrode mixes is preferably selected that the ratio of polyacrylamide to styrene-acrylate copolymer and/or carboxylated styrene-butadiene copolymer is from about 0.2:1 to about 1:1, and more preferably from about 0.2:1 to about 0.4:1, on a dry weight basis.

The binders of this invention are advantageously employed in an aqueous binder solution comprising water, polyacrylamide and at least one copolymer selected from the group consisting of carboxylated styrene-butadiene copolymer and styrene-acrylate copolymer. The expression "solution" as used herein is meant to encompass true solutions in which the polymers are uniformly dispersed at the molecular level, as well as colloidal solutions. When the aqueous binder solution is prepared separately and subsequently, combined with an active electrode material and optional conductive material and other additives, an amount of water sufficient to create a stable solution is employed. The amount of water used may range from the minimum amount needed to create a stable solution to an amount needed to achieve a desired total solids content in an electrode mix after the active electrode material, optional conductive material, and other solid additives have been added.

An electrode mixture in accordance with the invention may comprise an aqueous binder solution containing water, polyacrylamide, and a copolymer selected from the group consisting of carboxylated styrene-butadiene copolymer and styrene-acrylate copolymer; and an active electrode material. The electrode mixture may further comprise a conductive material. A small amount of surfactant may also be added to the electrode mixture to improve adhesion and wetting of the electrode mixture with a metal substrate. It is desired that the surfactant be used in small amounts and that it not show substantial electrochemical activity in the voltage range of operation of the electrode. Examples of commercially available surface active materials which may be used to improve adhesion and wetting of an electrode mixture with a metal substrate include TRITON™ X35 (octylphenoxypolyethoxyethanol), available from Rohm & Haas, and CF10 available from Union Carbide Corp. Each of these surface-active agents has been found to be substantially inactive electrochemically and to improve the adhesion of electrode mixtures with metal substrates in at least some cases. It is also sometimes useful to add a dispersant, such as a polyelectrolyte, e.g., TAMOL® 1124, available from Rohm & Haas, in order to maintain the mixture in a suspended state until the mixture is shaped into the form of a desired electrode. A water-soluble additive such as CaO, $Li_2CO_3$ or $K_2CO_3$, may also be added to the electrode mixture to maintain an alkaline pH. Such water-soluble additives are added in an amount sufficient to maintain a pH of from about 8 to about 12. It is often desirable to maintain an alkaline pH in the electrode mixture, since acidic mixtures may cause chemical attack on some metal substrates. The alkaline additive also helps neutralize any acidic impurities in the mixture that tend to destabilize the aqueous solution. A wetting agent, such as 2-amino-2-methyl-1-propanol, may be added to further enhance wetting and adhesion when the electrode mixture is coated on a metal substrate. The surfactant (surface active agent), water-soluble alkaline additive, wetting agent, and other additives may be added to an aqueous binder solution prior to addition of an active electrode material and optional conductive material, or to an electrode mixture containing an active electrode material and optionally containing a conductive material.

Active electrode materials include electrochemically active materials, as well as materials which are capable of intercalating and/or de-intercalating a light metal ion, such as a lithium ion, sodium ion or potassium ion. Examples of positive electrode materials include $LiCoO_2$, $LiMn_2O_4$ and $LiNiO_2$ for rechargeable lithium ion cells. Examples of useful positive electrode materials for primary lithium metal cells include $FeS_2$, $TiS_2$, $V_2O_5$ and $MnO_2$. Examples of conductive materials that may be used in positive electrode mixtures include acetylene black and graphite. Examples of negative active electrode materials capable of intercalating and de-intercalating a light metal ion include carbon and graphite materials, such as needle coke, and natural or synthetic graphite.

The process for making an electrode in accordance with this invention comprises the steps of combining and mixing water, an active electrode material, and a water-soluble binder to obtain a formable electrode mixture, the water-dispersible binder including polyacrylamide and at least one copolymer selected from the group consisting of carboxylated styrene-butadiene copolymer and styrene-acrylate copolymer; shaping the electrode mixture into a desired electrode form; and removing water from the desired electrode form to make the electrode. An optional conductive particulate material and other additives may be added prior to the shaping step. The water, active electrode material, water-dispersible binder, optional conductive material, and other additives may be combined in any order. The order in which the additives are combined may, in general be selected to minimize the time and energy needed for achieving a satisfactory homogeneous mixture.

A preferred technique for shaping the electrode mixture into a desired electrode form involves coating the electrode mixture onto a metal substrate. Preferably, the metal substrate acts as a current collector and as a carrier for the active electrode material in the mixture. The metal substrate may be a thin, pliable sheet of metal, i.e. a metal foil. The electrode mixture may be applied (coated) onto a surface of a substrate using generally any conventional method, such as dip coating, spray coating, brush coating, roll coating, etc. As an alternative to coating, the electrode mixture may be shaped into a desired electrode form using various well-known molding, casting and/or extrusion techniques.

After the electrode mixture has been coated onto a substrate, and before the water is removed from the electrode mixture, the electrode mixture that is coated onto the substrate may be compressed to increase the density of the electrode mixture. Desirably, the electrode mixture is compressed sufficiently so that the compressed electrode mixture has a solids content of from about 50% to about 70% on a weight basis. The electrodes of this invention comprise an active electrode material; and a binder containing polyacrylamide and at least one copolymer selected from the group consisting of carboxylated styrene-butadiene copolymer and styrene-acrylate copolymer. A battery in accordance with the invention comprises a positive electrode and a negative electrode, wherein at least one of the positive electrode and negative electrode includes a dry electrode mixture containing an active electrode material and a binder, wherein the binder includes polyacrylamide and at least one copolymer selected from the group consisting of carboxylated styrene-butadiene copolymer and styrene-acrylate copolymer.

Figure 2:
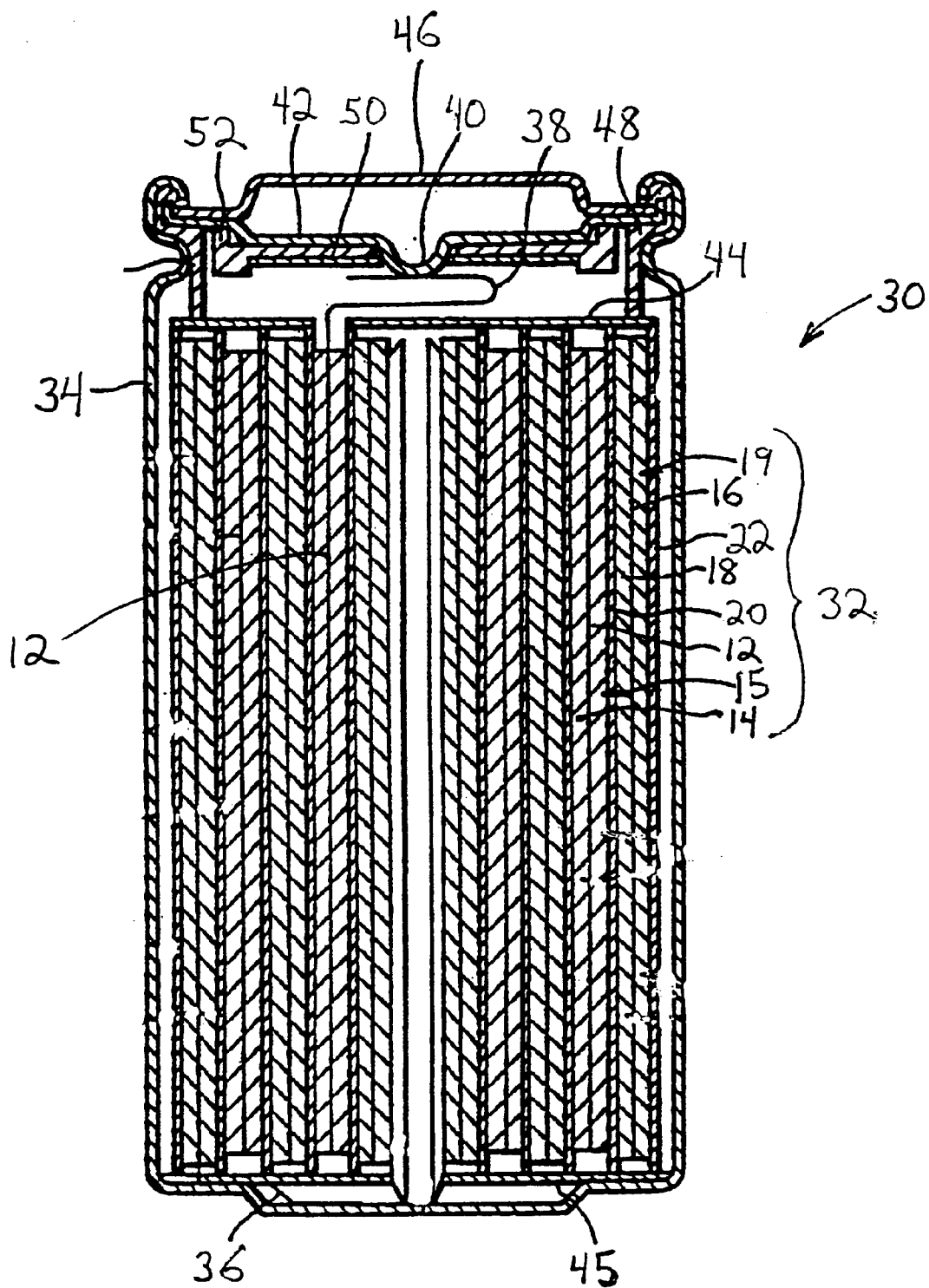
FIG. 2 is a schematic cross-sectional representation of an electrochemical cell including a laminated electrochemical cell assembly of the type shown in FIG. 1, which is spirally wound and disposed within a cylindrical can to provide a battery having a very high interfacial area between the first electrode and the second electrode.

The binders of this invention may be used to fabricate electrodes from a particulate active electrode material into a variety of shapes and sizes for use in various different types of battery structures. However, on account of their excellent adhesive properties, flexibility and resilience, the binders of this invention may be advantageously employed in primary and secondary batteries, having either aqueous or non-aqueous electrolytes, in which the binder is used in an electrode mixture that is coated onto a metal foil which acts as a carrier for the electrode mixture and as a current carrier. The resulting laminar electrodes may be used, for example, in stacked sheet-like configurations or in spirally wound configurations. FIG. 1 shows a multiple layer battery assembly 10 comprising a first metal foil carrier/current collector 12 that has been coated on each side with a positive electrode mixture to form layers 14 and 15, a second metal foil carrier/current collector 16 coated on opposite sides thereof with a negative electrode mixture to form layers 18 and 19, a first separator layer 20 disposed between layers 15 and 18, and a second separator layer 22 disposed under layer 19. Laminar battery assembly 10 may be spirally wound as shown in FIG. 2 to form a battery 30 having a spirally wound electrode body 32. The spirally wound electrode body 22 is encased in a battery can 34. A negative electrode lead 36 is attached to negative electrode collector 16 and welded to a bottom face of battery can 34. A positive electrode lead 28 is attached to positive electrode collector 12 and is welded to a portion 30 of a metallic safety valve 42. An electrolyte solution is charged into battery can 24 to impregnate the spirally wound electrode body 32 with the electrolyte solution. Insulator plates 44, 45 are disposed on opposite upper and lower end surfaces of spirally wound electrode body 32. Safety valve 42 and a metallic cap 46 are sealed against each other by an insulating sealing gasket 48. A layer 50 and an intermediate fitting member 52 formed of an insulating material unit safety valve 42 and layer 50 to provide a double safety device.

Battery 30 shown in FIG. 2 is merely illustrative of a specific application of the invention, and the details thereof are well known in the art and do not constitute a part of the invention. The binders, binder solutions, electrode mixtures, and electrodes of this invention may be used in any of the various battery configurations, including cylindrical batteries such as AA, AAA, AAAA, C and D, prismatically shaped batteries such as those having the shape of a standard 9-volt battery, miniature coin-shaped batteries, and others.

The invention will be further illustrated with reference to the following examples.

EXAMPLES

Various electrode mixtures were prepared by dissolving polyacrylamide in about half the estimated amount of water needed for about two hours with stirring to form a polyacrylamide solution. Active electrode material and any optional conductive powders were mixed to form homogeneous blends. To the remaining water any desired additives (e.g., surfactants, dispersants, deaeraters, defoamers, etc.) and styrene-acrylate copolymer and/or carboxylated styrene-butadiene copolymer were added to form a suspension. The polyacrylamide solution, the homogeneous blend of active electrode material and any conductive powders, and the suspension were combined and blended to form various electrode mixtures having a cookie dough consistency. Thereafter, the pH of each of the electrode mixtures was adjusted to 9.5 by adding CaO. In general, it was desirable to blend the electrode mix overnight, or as long as 24 hours, to ensure a uniform coating of the particles with the binder.

After each of the electrode mixtures was adequately stirred, a piece of metal foil was placed on a drawdown table to allow coating of the foil with the electrode mixture. A doctor blade or a wire-wound rod was fixed in the drawdown table at the top of the meal foil. A sufficient amount of an electrode mixture to completely coat the metal foil is placed next to the doctor blade or the wire-wound rod. The doctor blade is then pulled along the length of the metal foil to coat the metal foil with the electrode mixture. The coated foil was removed from the table and left to dry in the air. Alternatively, a roll-coating machine may be filled with the electrode mixture and a continuous strip of metal foil may be roll-coated on both sides and then heated to drive off the water in the coating. It is generally desirable, for either laboratory made or roll-coated electrodes, to compress or calendar the electrode by drawing it through a roll mill. The objective of this step is to increase the density of the coating from the as-cast value of about 30% to 40% solids to a value of about 50% to 70% solids in order to maximize the conductivity of the coating and minimize the volume of the coating in the cell.

Table 1 shows an electrode mixture formulation used to make cathodes for primary Li/FeS$_2$ cells. Another formulation identical to the formulation in Table 1 was prepared except that a styrene-acrylate (SA) copolymer (UNOCAL®76 Res 1018) was used instead of the carboxylated styrene-butadiene (SB) copolymer (UNOCAL® 76 Res 4076). Both electrode mixtures exhibited very good to excellent texture and cohesion, good flexibility, and good cathode resistance (3.83–3.90 ohms). Both electrode mixtures also exhibited excellent adhesion (11.16 kg for the electrode mixture containing a binder comprising carboxylated styrene-butadiene and polyacrylamide, and 12.36 kg for the electrode having a binder comprising styrene-acrylate and polyacrylamide). Adhesion tests were performed according the following procedure. Two circular 1.5 diameter pieces of double-sided adhesive tape with protective film on both sides were prepared. The film from one side of each piece of tape was removed, one of the pieces of tape was pressed against the top plate of an AccuForce 500 gauge, and the other piece of tape was pressed against the bottom plate of the AccuForce 500 gauge. The remaining film was removed from the pieces of tape pressed against the top and bottom plates of the gauge. A piece of electrode, coated on one side, was cut to a size slightly larger than the gauge plates, and placed over the tape on the bottom gauge plate. Pressure was applied to the gauge plates, closing the gap between the gauge plates to firmly adhere the tape to both surfaces of the electrode sample, and to zero the gauge. The pressure was gradually decreased on the gauge plates until the electrode coating began to pull away from the metal foil. The reading on the gauge, which is a measurement of the maximum tension (kg) prior to release of the electrode coating from the metal foil, was recorded.

Similar results were observed for negative electrode mixtures comprising graphite, with or without acetylene black, using a combination of carboxylated styrene-butadiene and/or styrene-acrylate with polyacrylamide. Such electrode coatings typically had an average coating adhesion greater than 10 kg when the conductive material was a mixture of graphite and acetylene black, whereas similar electrode mixtures using carboxylated styrene-butadiene and/or styrene-acrylate copolymer without polyacrylamide had an average coating adhesion of about 2 kg.

The performance of rechargeable coin cells manufactured with electrodes using the binders of this invention was evaluated. Positive electrodes were made from LiCoO2 (from either FMC Co. or Cyprus Foote Co.), KS-15 graphite (with or without acetylene black conductive additives) and styrene-acrylate/polyacrylamide binder (at 3 or 4 dry weight percent). Negative electrodes were made from Conoco XP13 coke, acetylene black and binders of carboxylated styrene-butadiene and polyacrylamide. The electrode mixtures were coated onto metal foils and cut into disks (1.89 cm$^2$ area, from which 2016 size coin cells were constructed. Selected cells were cycled extensively. All of the cells with both KS-15 graphite and acetylene black in the positive electrode cycled with very small fade (capacity loss as a function of the number of charge/discharge cycles).

The performance of AA size cells with electrodes of this invention were also evaluated. Conoco XP13 coke, acetylene black and carboxylated styrene-butadiene/polyacrylamide binder were used in the negative electrodes. FMC LiCoO$_2$, KS-15 graphite, either carbon black or acetylene black conductors and styrene-acrylate/polyacrylamide binder (at either 3 or 4 dry weight percent) were used in the positive electrodes. Cells were constructed with these electrodes and cycled at various currents and charge conditions. The initial capacities ranged from 300 to 350 mAh. Cycling was continued until the capacity faded to 200 mAh. The capacity held at 200 mA or greater for from 500 to more than 800 cycles, depending on the charge/discharge regime, and to some extent, the starting capacity.

The above description is considered that of the preferred embodiments only. Modifications of the invention will occur to those skilled in the art and to those who make or use the invention. Therefore, it is understood that the embodiments shown in the drawings and described above are merely for illustrative purposes and are not intended to limit the scope of the invention, which is defined by the following claims as interpreted accordingly to the principles of patent law, including the doctrine of equivalents.

What is claimed is:

1. A battery comprising:
    a positive electrode;
    a negative electrode; and
    an electrolyte;
    at least one of the positive electrode and the negative electrode includes an electrode mixture containing an active electrode material and a binder, wherein the binder contains polyacrylamide and at least one copolymer selected from the group consisting of carboxylated styrene-butadiene copolymer and styrene-acrylate copolymer, and wherein the ratio of the polyacrylamide to the at least one copolymer is from about 0.2:1 to about 1:1 on a dry weight basis.

2. The battery of claim 1, wherein the ratio of the polyacrylamide to the at least one copolymer is from about 0.2:1 to about 0.4:1 on a dry weight basis.

3. The battery of claim 1, wherein the electrode mixture is adhered to a current collector.

4. The battery of claim 3, wherein the current collector is a metal foil.

5. The battery of claim 1, wherein the electrolyte is a non-aqueous electrolyte.

6. The battery of claim 1, wherein the positive electrode includes the electrode mixture and wherein the positive electrode active material is selected from the group consisting of $LiCoO_2$, $LiMn_2O_4$, $LiNiO_2$, $FeS_2$, $TiS_2$, $V_2O_5$ and $MnO_2$.

7. The battery of claim 6, wherein the total amount of binder in the positive electrode is from about 0.5% to about 4% of the weight of the electrode on a dry basis.

8. The battery of claim 6, wherein the positive electrode further comprises a conductive material.

9. The battery of claim 8, wherein the conductive material is selected from the group consisting of carbon black, acetylene black and graphite.

10. The battery of claim 1, wherein the negative electrode includes the electrode mixture and wherein the negative electrode active material is a material capable of intercalating and de-intercalating a light metal ion.

11. The battery of claim 10 wherein the total amount of binder in the negative electrode is from about 2% to about 7% of the weight of the electrode on a dry basis.

12. The battery of claim 10, wherein the active electrode material is a carbonaceous material selected from the group consisting of needle coke, natural graphite and synthetic graphite.

13. The battery of claim 12 wherein the light metal ion is lithium ion.

14. A battery comprising:
a positive electrode including an electrode mixture containing an active electrode material, and a binder containing polyacrylamide and at least one copolymer selected from the group consisting of carboxylated styrene-butadiene copolymer and styrene-acrylate copolymer,
a negative electrode including an electrode mixture containing an active electrode material, and a binder containing polyacrylamide and at least one copolymer selected from the group consisting of carboxylated styrene-butadiene copolymer and styrene-acrylate copolymer; and
an electrolyte;
wherein the ratio of the polyacrylamide to the at least one copolymer in each electrode is from about 0.2:1 to about 1:1 on a dry weight basis.

15. The battery of claim 14, wherein the ratio of the polyacrylamide to the at least one copolymer in each electrode is from about 0.2:1 to about 0.4:1 on a dry weight basis.

16. The battery of claim 14, wherein each of the electrode mixtures is adhered to a current collector.

17. The battery of claim 16, wherein the current collector is a metal foil.

18. The battery of claim 14, wherein the positive electrode includes the electrode mixture and wherein the positive electrode active material is selected from the group consisting of $LiCoO_2$, $LiMn_2O_4$, $LiNiO_2$, $FeS_2$, $TiS_2$, $V_2O_5$ and $MnO_2$.

19. The battery of claim 18, wherein the positive electrode further comprises a conductive material.

20. The battery of claim 19, wherein the conductive material is selected from the group consisting of carbon black, acetylene black and graphite.

21. The battery of claim 19, wherein the total amount of binder in the positive electrode is from about 0.5% to about 4% of the weight of the electrode mixture.

22. The battery of claim 14, wherein the active electrode material in the negative electrode is a material capable of intercalating and de-intercalating a light metal ion.

23. The battery of claim 22, wherein the negative electrode active material is a carbonaceous material selected from the group consisting of needle coke, natural graphite and synthetic graphite.

24. The battery of claim 22, wherein the total amount of binder in the negative electrode is from about 2% to about 7% of the weight of the electrode mixture.

25. The battery of claim 13, wherein the battery is a primary battery, wherein the electrolyte is a non-aqueous electrolyte, wherein the active material in the positive electrode is $FeS_2$; and the active material in the negative electrode is a lithium metal or a lithium alloy.

26. A process for making an electrode, comprising:
combining and mixing water, an active electrode material, and a water-soluble binder to obtain a formable electrode mixture, the water-soluble binder containing polyacrylamide and at least one copolymer selected from the group consisting of carboxylated styrene-butadiene copolymer and styrene-acrylate copolymer;
shaping the electrode mixture into a desired electrode form; and
removing water from the desired electrode form to make the electrode;
wherein the ratio of the polyacrylamide to the at least one copolymer is from about 0.2:1 to about 1:1 on a dry weight basis.

27. The process of claim 26, wherein the ratio of the polyacrylamide to the at least one copolymer is from about 0.2:1 to about 0.4:1 on a dry weight basis.

28. The process of claim 26, wherein a surfactant is added to the electrode mixture.

29. The process of claim 26, wherein an alkaline water-soluble additive is added to the electrode mixture.

30. The process of claim 29, wherein the alkaline water-soluble additive is selected from the group consisting of CaO, $Li_2CO_3$ and $K_2CO_3$.

31. The process of claim 29, wherein the alkaline water-soluble additive is added in an amount sufficient to impart an alkaline pH to the electrode mixture.

32. The process of claim 31, wherein the pH is from about 8 to about 12.

33. The process of claim 26, wherein the electrode is a positive electrode and wherein the active electrode material is selected from the group consisting of $LiCoO_2$, $LiMn_2O_4$, $LiNiO_2$, $FeS_2$, $TiS_2$, $V_2O_5$ and $MnO_2$.

34. The process of claim 33, wherein the positive electrode further comprises a conductive material.

35. The process of claim 34, wherein the conductive material is selected from the group consisting of carbon black, acetylene black, and graphite.

36. The process of claim 34, wherein the total amount of binder in the positive electrode is from about 0.5% to about 4% of the weight of the electrode mixture.

37. The process of claim 26, wherein the electrode is a negative electrode, and wherein the active material is a material capable of intercalating and de-intercalating a light metal ion.

38. The process of claim 37, wherein the negative electrode active material is a carbonaceous material selected from the group consisting of needle coke, natural graphite and synthetic graphite.

39. The process of claim 37, wherein the total amount of binder in the negative electrode is from about 2% to about 7% of the weight of the electrode mixture.

40. The process of claim 26, wherein shaping of the electrode mixture into a desired electrode form is achieved by coating the electrode mixture onto a substrate.

41. The process of claim 40, wherein the substrate is a metal foil.

42. The process of claim 40, wherein the electrode mixture that is coated onto the substrate is compressed to increase the density of the electrode mixture before removing water from the desired electrode form.

43. The process of claim 42, wherein the compressed electrode mixture has a solids content of from about 50% to about 70% on a weight basis before removing water from the desired electrode form.

44. A water-soluble binder for an electrode, comprising:
polyacrylamide; and
at least one copolymer selected from the group consisting of carboxylated styrene-butadiene copolymer and styrene-acrylate copolymer;
wherein the ratio of the polyacrylamide to the at least one copolymer is from about 0.2:1 to about 1:1 on a dry weight basis.

45. The water-soluble binder of claim 44, wherein the ratio of the polyacrylamide to the at least one copolymer is from about 0.2:1 to about 0.4:1 on a dry weight basis.

46. An aqueous binder solution useful for preparing an electrode, comprising:
water;
Polyacrylamide; and
at least one Copolymer selected from the group consisting of carboxylated styrene-butadiene copolymer and styrene-acrylate copolymer,
wherein the ratio of the polyacrylamide to the at least one copolymer is from about 0.2:1 to about 1:1 on a dry weight basis.

47. The aqueous binder solution of claim 46, wherein the ratio of the polyacrylamide to the at least one copolymer is from about 0.2:1 to about 0.4:1 on a dry weight basis.

48. The aqueous binder solution of claim 46, further comprising a surfactant.

49. The aqueous binder solution of claim 46, further comprising an alkaline water-soluble additive.

50. The aqueous binder solution of claim 49, wherein the alkaline water-soluble additive is selected from the group consisting of CaO, $Li_2CO_3$ and $K_2CO_3$.

51. The aqueous binder solution of claims 49, wherein the alkaline water-soluble additive is added in an amount sufficient to impart an alkaline pH to the electrode mixture.

52. The aqueous binder solution of claim 51, wherein the pH is from about 8 to about 12.

53. An electrode mixture for preparing electrodes, comprising:
an aqueous binder solution containing water, polyacrylamide, and a copolymer selected from the group consisting of carboxylated styrene-butadiene copolymer and styrene-acrylate copolymer; and
an active electrode material;
wherein the ratio of the polyacrylamide to the at least one copolymer is from about 0.2:1 to about 1:1 on a dry weight basis.

54. The electrode mixture of claim 53, wherein the ratio of the polyacrylamide to the at least one copolymer is from about 0.2:1 to about 0.4:1 on a dry weight basis.

55. The electrode mixture of claim 53, wherein the active electrode material is selected from the group consisting of $LiCoO_2$, $LiMn_2O_4$, $LiNiO_2$, $FeS_2$, $TiS_2$, $V_2O_5$ and $MnO_2$.

56. The electrode mixture of claim 55, wherein the total amount of binder in the electrode mixture is from about 0.5% to about 4% of the weight of the electrode mixture.

57. The electrode mixture of claim 55, further comprising a conductive material.

58. The electrode mixture of claim 57, wherein the conductive material is selected from the group consisting of carbon black, acetylene black and graphite.

59. The electrode mixture of claim 53, wherein the active electrode material is a material capable of intercalating and deintercalating a light metal ion.

60. The electrode mixture of claim 59, wherein the active electrode material is carbonaceous material selected from the group consisting of needle coke, natural graphite and synthetic graphite.

61. The electrode mixture of claim 59, wherein the total amount of binder in the electrode mixture is from about 2% to about 7% of the weight of the electrode mixture.

62. A baby comprising a positive electrode, a negative electrode and an electrolyte, wherein:
the battery is a primary battery;
the electrolyte is a non-aqueous electrolyte;
the negative electrode comprises a lithium metal or a lithium alloy;
the positive electrode includes an electrode mixture comprising $FeS_2$ and a binder; and
the binder contains polyacrylamide and at least one copolymer selected from the group consisting of carboxylated styrene-butadiene copolymer and styrene-acrylate copolymer.

63. The battery of claim 62, wherein the ratio of the polyacrylamide to the at least one copolymer is from 0.2:1 to about 0.4:1 on a dry basis.

* * * * *